AUTOMATIC BRIGHTNESS AND CONTRAST CONTROL CIRCUIT

Filed July 11, 1960

INVENTOR
ROBERT SUHRMANN
BY
Frank R. Jifari
AGENT

United States Patent Office 3,112,424
Patented Nov. 26, 1963

3,112,424
AUTOMATIC BRIGHTNESS AND CONTRAST CONTROL CIRCUIT

Robert Suhrmann, Hamburg-Rahlstedt, Germany, assignor to North American Philips Company, Inc., New York, N.Y., a corporation of Delaware Filed July 11, 1960, Ser. No. 41,979
Claims priority, application Germany Sept. 4, 1959
3 Claims. (Cl. 315—10)

The invention relates to a television receiver containing a circuit arrangement for the preferably automatic control of the background brightness and the contrast of the picture to be reproduced in accordance with the ambient brightness.

From the German patent application 1,035,198 it is known that a distortion of the gradation of the picture is produced by the incidence of ambient light on the display screen of the picture tube in a television receiver. Hence, not only the background brightness (display-screen brightness at black level) but also the amplification of the video-signal between black level and white level must be controlled to obtain optimum contrast (ratio between the display-screen brightness at white level and the display-screen brightness at black level) with due regard to the circumstances, in particular to the maximum possible control voltage applied between grid and cathode of the picture tube.

Such a control obviously requires a certain expenditure of additional circuit elements and this may not be desirable in simple and cheap receivers.

In a circuit arrangement of the kind described hereinbefore a satisfactory approximation to optimum reproduction is obtained with minimum expenditure if, in accordance with the invention, up to a mean ambient brightness of, for example, 50 apostilbs (asb.) the background brightness is maintained substantially constant and only the contrast is increased, whereas at a higher ambient brightness the background brightness is increased but the contrast is maintained constant or increased to a considerably lesser extent only.

Investigations underlying the invention have shown that with low expenditure the smallest defects in the gradiation and hence in the picture quality are obtained if at low ambient brightness only the contrast is controlled. At a comparatively high ambient brightness, especially when the contrast can hardly be increased any further since otherwise the display device would be overloaded, the reproduction can nevertheless be improved by increasing the background brightness in accordance with the ambient brightness.

The invention will now be described more fully by way of example with reference to the accompanying drawing in which.

Figure 1:
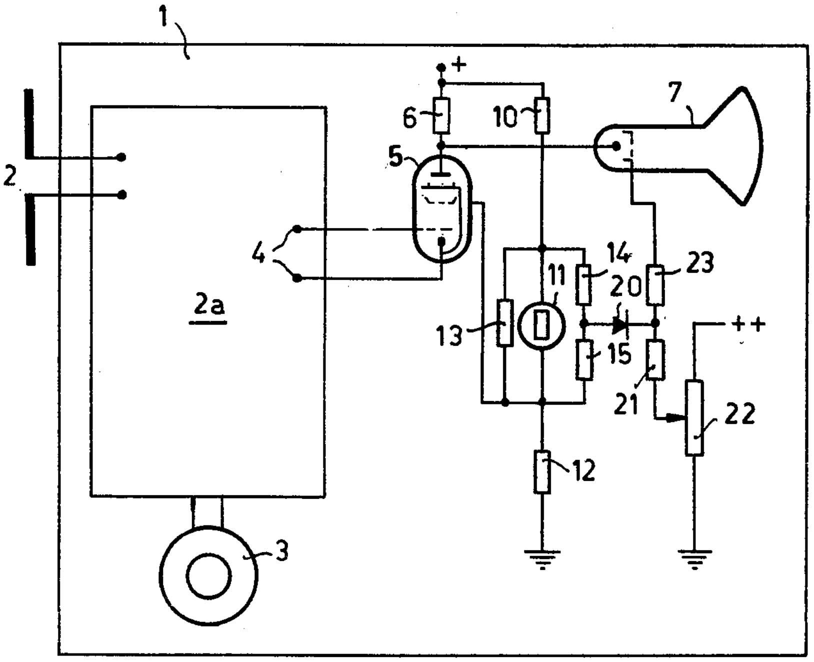
FIG. 1 shows a television receiver in accordance with the invention.

A television receiver 1 to which signals are supplied by means of an aerial 2 contains in known manner an amplifier and detector part 2*a*. At least one loudspeaker 3 is connected thereto for sound reproduction. The signals obtained from a video-detector are applied through terminals 4 to the cathode and the grid of a video-amplifier pentode 5, the suppressor grid of which is connected to the cathode. The anode of the video tube 5 is connected through a resistor 6 to the positive terminal of the supply source. To this anode is also connected, if required through elements (not shown) for the correction of the frequency characteristic, the cathode of a display tube 7, the electron gun and deflection parts of which are not shown since they are well known.

A series combination of a series resistor 10, a photoconductor 11 and a load resistor 12 is connected in parallel with the supply source.

Figure 2:
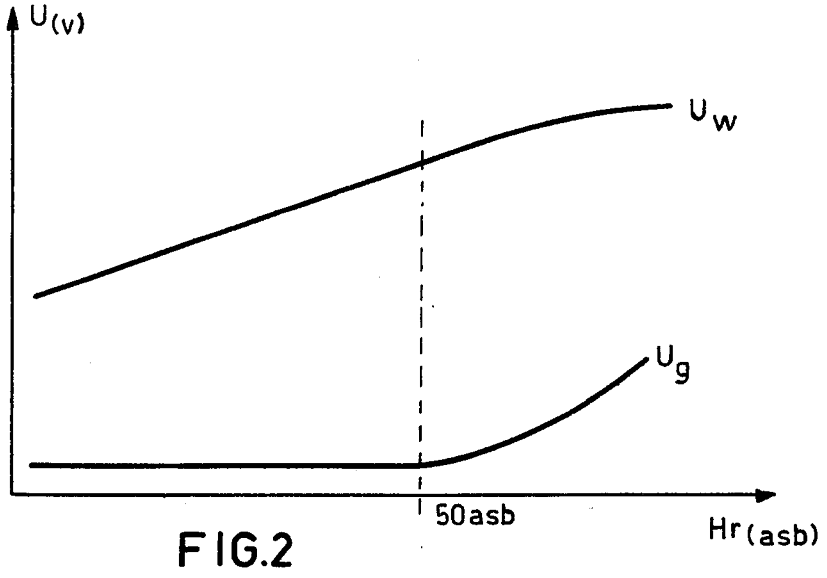
FIG. 2 shows the control curve obtained.

A resistor 13 and a voltage divider comprising two resistors 14 and 15 are connected in parallel with the photoconductor 11. In a known manner, the arrangement is connected and proportioned so that at the junction point of the photo-conductor 11 and the load resistor 12, to which point the screen grid of the tube 5 is connected, a voltage appears in accordance with the ambient brightness. Due to the variation of screen grid voltage with ambient brightness the amplification of the video signal increases with increasing ambient brightness and hence the voltage value $U_W$ controlling the display tube 7 at white level. Taking into consideration the current voltage characteristic curves of the video tube 5 and of the detector circuit controlling this tube, there is produced a variation of the white voltage $U_W$ applied to the cathode of the display tube 7 as shown in FIG. 2. Thus, no appreciable further increase of the voltage for picture white and hence of the contrast occurs above a mean picture brightness of about 50 apostilbs $$\left(1 \text{ apostilb} = 1 \frac{\text{candle}}{10^4 \pi \text{ cm.}^2}\right)$$

From the junction of the resistors 14 and 15 a voltage is taken which in known circuit arrangements is directly applied to the control electrode (Wehnelt cylinder) of the display tube 7 and determines the bias thereof and hence the screen brightness at black level.

According to the present invention, there is interposed between this tapping and earth the series combination of a diode 20 and a resistor 21 and of a bias voltage produced at a tapping of a potentiometer 22 connected in parallel with an auxiliary supply source ++. If the resistance of the potentiometer 22 is high enough and an adjustment occurs in its middle range only, the resistor 21 may be omitted.

At low values of the ambient brightness, the voltage set up at the tapping between the resistors 14 and 15 is less than the voltage at the sliding contact of the potentiometer 22. Hence, the diode, the anode of which is connected to the junction of the resistors 14 and 15, is cut off. At a certain value of the ambient brightness of, say, 50 apostilbs, it comes to pass that, in accordance with the proportioning of the resistors, the diode 20 becomes conducting and the voltage at the junction of the resistors 14 and 15 is transmitted through a series resistor 23 to the control electrode (Wehnelt cylinder) of the display tube 7. The voltage $U_g$ set up at this control electrode shows a variation as shown in FIG. 2, that is to say that the background brightness increases with increase in the ambient brightness. Because the resistance value of the light dependent resistor 11 decreases by increasing ambient brightness, the above given result can only be obtained when the voltage at the anode of the diode 20 increases with decreasing resistance value of resistor 11. This can be accomplished by giving the resistors 10, 12, 14 and 15 such resistance values that $$R_{10}R_{15} < R_{14}R_{12}$$

in which $R_{10}$, $R_{12}$, $R_{14}$ and $R_{15}$ are the resistance values of resistors 10, 12, 14 and 15, respectively.

Thus, a highly satisfactory accommodation of the reproduced picture to the ambient brightness is obtained at a low expenditure.

What is claimed is:

1. In a television receiver, an image reproducing device having first and second control electrodes, a source of video signals, means applying said video signals to said first control electrode, means having a control terminal for varying the amplitude of said signals in response to a control voltage applied to said terminal, a source of potential, voltage divider means comprising series connected first resistor, photo conductor, and second resistor connected to said source of potential, means connecting the junction of said first resistor and photo conductor to said control terminal, third resistor connected in parallel with said photo conductor, said third resistor having a tap, diode means connected between said tap and said second control electrode, a source of bias voltage, and resistor means connecting said source of bias voltage to the electrode of said diode means not connected to said tap.

2. In a television receiver, an amplifier device having input, output and contrast control electrodes, an image reproducing device having first and second control electrodes, a source of video signals, means applying said signals to said input electrode, means connecting said output electrode to said first control electrode, a source of operating voltage, a resistive voltage divider comprising a series circuit of a first resistor, a photo conductor, and a second resistor, in that order, means connecting said voltage divider to said operating voltage, means connecting the junction of said first resistor and photo conductor to said contrast control electrode, third resistor means connected in parallel with said photo conductor, said third resistor means having a tap, a source of bias voltage, diode means, means connecting said diode between said tap and second control electrode, and resistor means connecting said source of bias voltage to the electrode of said diode means not connected to said tap.

3. In a television receiver, an electron discharge device having a control grid, a screen grid, and an anode, an image reproducing device having first and second control electrodes, a source of signals connected to said control grid, means connecting said anode to said first control electrode, a voltage divider comprising a series circuit of a first resistor, a photo conductor, and a second resistor, in that order, a series circuit of a third and fourth resistor connected in parallel with said photo conductor, a source of voltage having a negative terminal connected to said first resistor and a positive terminal connected to said second resistor, means connecting the junction of said first resistor and photo conductor to said screen grid, a diode having an anode and a cathode, means connecting the anode of said diode to the junction of said third and fourth resistors, means connecting the cathode of said diode to said second control electrode, a source of positive bias voltage, and resistor means connected between said cathode and said source of bias voltage.

References Cited in the file of this patent

UNITED STATES PATENTS

| | | |
|---|---|---|
| 2,264,172 | Batchelor | Nov. 25, 1941 |
| 2,310,671 | Batchelor | Feb. 9, 1943 |
| 3,027,421 | Heijligers | Mar. 27, 1962 |

FOREIGN PATENTS

| | | |
|---|---|---|
| 440,895 | Italy | Oct. 20, 1948 |
| 516,408 | Italy | Feb. 21, 1955 |